(12) United States Patent
Loh

(10) Patent No.: US 12,432,078 B1
(45) Date of Patent: Sep. 30, 2025

(54) ETHERNET-BASED POWER SOURCING EQUIPMENT

(71) Applicant: HYPERCONN PTE. LTD., Singapore (SG)

(72) Inventor: Hoong Huat Loh, Singapore (SG)

(73) Assignee: HYPERCONN PTE. LTD., Singapore (SG)

( * ) Notice: Subject to any disclaimer, the term of this patent is extended or adjusted under 35 U.S.C. 154(b) by 0 days.

(21) Appl. No.: 18/761,436

(22) Filed: Jul. 2, 2024

Related U.S. Application Data

(63) Continuation of application No. PCT/SG2024/050188, filed on Mar. 27, 2024.

(51) Int. Cl.
*H04L 12/10* (2006.01)

(52) U.S. Cl.
CPC .................................. *H04L 12/10* (2013.01)

(58) Field of Classification Search
CPC ....................................................... H04L 12/10
See application file for complete search history.

(56) References Cited

U.S. PATENT DOCUMENTS

2018/0375673 A1* 12/2018 Wendt ...................... H04L 12/10

FOREIGN PATENT DOCUMENTS

| CN | 101371492 A | 2/2009 |
|---|---|---|
| CN | 106330467 A | 1/2017 |
| CN | 107566131 A | 1/2018 |
| CN | 112202571 A | 1/2021 |
| CN | 220342327 U | 1/2024 |

OTHER PUBLICATIONS

International Search Report issued in corresponding International application No. PCT/SG2024/050188, mailed Jul. 23, 2024 (8 pages).
Written Opinion of the International Search Authority in corresponding International application PCT/SG2024/050188, mailed Jul. 23, 2024 (11 pages).

* cited by examiner

*Primary Examiner* — Ryan Johnson
(74) *Attorney, Agent, or Firm* — HOWARD M COHN and Associates, LLC

(57) ABSTRACT

The present application relates to Ethernet-based power sourcing equipment capable of supporting both standard and non-standard powered devices It includes: a control module for, determining the device specifications (I.e., device type, operating power and target power supply mode of a powered device) and outputting corresponding control signal a management module for managing a power provisioning status and a power output of respective ports, according to instructions of the control module; a first power module for providing a first voltage; a first power conversion module for converting the first voltage into a second voltage; a power selection module for controlling the first voltage or the second voltage to be output through the voltage output terminal, according to the output control signal of the control module.

10 Claims, 7 Drawing Sheets

| Standard PoE parameter comparison | | | | |
|---|---|---|---|---|
| Attributes | 802.3af (802.3at Type 1), PoE | 802.3at Type 2, PoE+ | 802.3bt Type 3, 4PPoE or PoE++ | 802.3bt Type 4, 4PPoE or PoE++ |
| Maximum obtained power of powered device | 12.95 W | 25.50 W | 51 W | 71.3 W |
| Maximum output power of power sourcing equipment | 15.40 W | 30.0 W | 60 W | 99.9 W |
| Voltage range of power sourcing equipment | 44.0-57.0 V | 50.0-57.0V | 50.0-57.0 V | 50.0-57.0 V |
| Voltage range of powered device | 37.0-57.0 V | 42.5-57.0 V | 42.5-57.0 V | 41.1-57.0 V |
| Maximum current | 350 mA | 600 mA | 600 mA/pair | 960 mA/pair |
| Power level | Level 1~3 | Level 4 | Level 5~6 | Level 7~8 |
| Supported network cables | CAT-3, CAT-5 | CAT-5 | CAT-5 | CAT-5 |
| Supported modes | Alternative A, Alternative B | Alternative A, Alternative B | Alternative A, Alternative B, 4-pair Power over Ethernet | 4-pair Power over Ethernet |

FIG. 2

| Non-standard PoE parameter comparison | | | | |
|---|---|---|---|---|
| Attributes | 2 pairs low | 2 pairs high | 4 pairs low | 4 pairs high |
| Maximum obtained power of powered device | 20.0 W | 40.0 W | 40.0 W | 80.0 W |
| Maximum output power of power sourcing equipment | 25.0 W | 50.0 W | 50.0 W | 100.0 W |
| Voltage range of power sourcing equipment | 24-26.4 V | 48-52.8 V | 24-26.4 V | 48-52.8 V |
| Voltage range of powered device | 21.6-26.4 V | 43.2-52.8 V | 21.6-26.4 V | 43.2-52.8 V |
| Maximum current | 960 mA | 960 mA | 960 mA/pair | 960 mA/pair |
| Power level | Level 1~3 | Level 4 | Level 5~6 | Level 7~8 |
| Supported network cables | CAT-5 | CAT-5 | CAT-5 | CAT-5 |
| Supported modes | Alternative A, Alternative B | Alternative A, Alternative B | 4-pair Power over Ethernet | 4-pair Power over Ethernet |

ETHERNET-BASED POWER SOURCING EQUIPMENT

TECHNICAL FIELD

The present application relates to the technical field of Power over Ethernet, and in particular, relates to an Ethernet-based power sourcing equipment.

BACKGROUND

Power over Ethernet (POE) is a technology capable of transmitting power and data to terminal apparatuses through twisted pairs over Ethernet. PoE is also called Power over LAN (POL) or Active Ethernet. PoE refers to the technology of transmitting data signals for some terminal apparatuses based on Internet Protocol (IP), such as door switches, webcams, WiFi access points, IP telephones, IP access control apparatuses or the like, and meanwhile providing DC power supply for such terminal apparatuses without any changes to the existing Ethernet Cat.5 wiring infrastructure.

A PoE system mainly consists of three parts: a power sourcing equipment (PSE), a powered device (PD) and Ethernet cables, wherein the PSE may transmit electric energy to the PD through the Ethernet cables, and the PD may acquire electric energy from the PSE through the Ethernet cables and convert the electric energy into ordinary voltage for its own use.

At present, there are three standard technologies for POE, namely 802.3af/at/bt, and a non-standard PoE technology (PASSIVE PoE). Both the standard PoE and the non-standard PoE support 2-pair power supply and 4-pair power supply (4PPoE). The 2-pair power supply includes an Alternative A and an Alternative B, which transmit the standard PoE voltage from the power sourcing equipment to the powered device respectively through 1-2/3-6 wire pairs and 4-5/7-8 wire pairs.

The standard PoE requires that the PSE must support one of the Alternative A, the Alternative B or 4PPoE, and the PD must be able to automatically identify and adapt to the Alternative A, the Alternative B or the 4PPoE. In contrast, since there is no standard constraint on the non-standard PoE, the PD in the non-standard PoE is not forced to support and automatically adapt to the Alternative A, the Alternative B or the 4PPoE. However, for a specific non-standard PD, a matching non-standard PSE (PASSIVE PSE) must be used. For example, the PD in the Alternative A must be used in combination with the PSE in the Alternative A, the PD in the Alternative B must be used in combination with the PSE in the Alternative B, and the PD in the 4PPoE must be used in combination with the PSE in the 4PPoE.

Generally, the Ethernet-based power sourcing equipment supports either the standard PoE or the non-standard PoE. However, in the actual engineering scene, there may be various standard PDs conforming to 802.3af/at/bt or the like and non-standard PDs (e.g., non-standard PDs with 2pair-low or non-standard PDs with 4pair-high) at the same time under the same PSE, so that the same PSE cannot supply power for the standard PDs and the non-standard PDs simultaneously.

SUMMARY

The Ethernet-based power sourcing equipment according to the embodiment of the present application can solve at least some defects in the prior art.

The present application discloses an Ethernet-based power sourcing equipment. The power sourcing equipment includes: a control module, being configured to: determine a device type, an operating power and a target power supply mode of a powered device, output a first control signal or a second control signal, and transmit the device type, the operating power, the target power supply mode, a protection voltage range, a protection current range and a protection temperature range to a management module; wherein the device type is used for indicating a standard powered device or a non-standard powered device; the management module, being configured to: manage a power provisioning status and a power output of respective ports, according to instructions of the control module, and transmit a voltage, a current, a power consumption, a temperature, a short-circuit states and a detection grading results of the respective ports to the control module; a first power module, being configured to provide a first voltage for the power sourcing equipment; a first power conversion module, being configured to convert the first voltage into a second voltage; a power selection module, being configured to control the first voltage to be output when the first control signal is received and control the second voltage to be output when the second control signal is received; wherein the voltage level of the first control signal is greater than the voltage level of the second control signal; a voltage output terminal, being configured to provide the first voltage or the second voltage to the powered device through the target power supply mode.

Optionally, the power selection module includes a signal input terminal, a first N-type MOS transistor, a first P-type MOS transistor, a second N-type MOS transistor, a second P-type MOS transistor, a first resistor, a second resistor, a third resistor, a fourth resistor, an inverter, a diode, a first power input terminal, a second power input terminal and a power output terminal; the signal input terminal is connected with the control module, the first power input terminal is connected with the first power module, and the second power input terminal is connected with the first power conversion module; the signal input terminal is respectively connected with a gate of the first N-type MOS transistor and an input terminal of the inverter, and an output terminal of the inverter is connected with a gate of the second N-type MOS transistor; a drain of the first N-type MOS transistor is connected with a first terminal of the first resistor, a second terminal of the first resistor is connected with a gate of the first P-type MOS transistor, and a source of the first N-type MOS transistor is connected to the ground; a source of the first P-type MOS transistor is respectively connected with the first power input terminal and a first terminal of the second resistor, a second terminal of the second resistor is connected with the gate of the first P-type MOS transistor, and a drain of the first P-type MOS transistor is connected with the power output terminal; a drain of the second N-type MOS transistor is connected with a first terminal of the third resistor, a second terminal of the third resistor is connected with a gate of the second P-type MOS transistor, and a source of the second N-type MOS transistor is connected to the ground; a source of the second P-type MOS transistor is respectively connected with the second power input terminal and a first terminal of the fourth resistor, and a second terminal of the fourth resistor is connected with the gate of the second P-type MOS transistor; when the first voltage is higher than the second voltage, a drain of the second P-type MOS transistor is connected with a positive electrode of the diode, and a negative electrode of the diode is connected with the power output terminal; when the first voltage is lower than the second voltage, the drain of the second P-type MOS transistor is connected with the negative electrode of the diode, and the positive electrode of the diode is connected with the power output terminal; wherein when the first control signal is received by the signal input terminal, both the first N-type MOS transistor and the first P-type MOS transistor are turned on, and the first voltage sequentially passes through the first power input terminal and the first P-type MOS transistor and is output to the power output terminal; the first control signal passes through the inverter to generate a first electrical signal with an inverted level, so that both the second N-type MOS transistor and the second P-type MOS transistor are turned off and the loop between the second power input terminal and the power output terminal is disconnected; when the second control signal is received by the signal input terminal, both the first N-type MOS transistor and the first P-type MOS transistor are turned off so that the loop between the first power input terminal and the power output terminal is disconnected; the second control signal passes through the inverter to generate a second electrical signal with an inverted level so that both the second N-type MOS transistor and the second P-type MOS transistor are turned on, and the second voltage sequentially passes through the second power input terminal, the second P-type MOS transistor and the diode and is output to the power output terminal.

Optionally, the management module includes a power input pin and negative electrodes for a plurality of power supplying wire pairs; and the voltage output terminal includes a network transformer and a network interface; the network transformer is respectively connected with the power input pin and the negative electrodes for the respective power supplying wire pairs, the management module is connected with the power selection module, and the network interface is respectively connected with the network transformer and the powered device; the management module is configured to perform switch control on the negative electrodes of the respective power supplying wire pairs based on the device type, the operating power and the target power supply mode; the power input pin is short-circuited with positive electrodes of the respective ports/positive electrodes of the respective power supplying wire pairs; the first voltage or the second voltage output by the power selection module sequentially passes through the power input pin, the negative electrodes of the plurality of power supplying wire pairs, the network transformer and the network interface, and is output to the powered device.

Optionally, the management module further includes a main processing unit, a serial interface, a detection grading unit, an analog to digital converter and a plurality of MOS transistors; the serial interface is respectively connected with the powered device, the detection grading unit and the analog to digital converter; the detection grading unit includes a detection subunit and a grading subunit; wherein the detection subunit is configured as follows: the detection subunit does not operate when the device type indicates a non-standard powered device; and the detection subunit performs detection processing according to a preset standard when the device type indicates a standard powered device; the grading subunit is configured as follows: the grading subunit does not operate when the device type indicates a non-standard powered device; and the grading subunit performs power grading processing and controls power for power supplying based on the preset standard and the operating power when the device type indicates a standard powered device; the analog to digital converter is configured to detect the voltage, current and temperature of the respective ports and transmit the voltage, current and temperature of the respective ports to a register, and the register transmits the voltage, current and temperature of the respective ports to the control module through the serial interface; the main processing unit is configured to set or acquire relevant register contents based on the instructions of the control module and protection thresholds of related parameters, and control and query the power supply behavior of the respective ports/the respective power supplying wire pairs; each MOS transistor among the plurality of MOS transistors corresponds to the negative electrode of one power supplying wire pair, and power supply or power supply interruption of the respective ports/the respective power supplying wire pairs is enabled by controlling the respective MOS transistors to be turned on or turned off.

Optionally, the control module includes an exchange computing unit and an device controller; the exchange computing unit is configured to determine the device type, the operating power and the target power supply mode, output the first control signal or the second control signal, transmit the device type, the operating power, the target power supply mode, the protection voltage range, the protection current range and the protection temperature range to the device controller, and learn the voltage, current, power consumption, temperature, short-circuit states and detection grading results of the respective ports from the management module through the device controller; the device controller is configured to forward the first control signal or the second control signal of the exchange computing unit to the power selection module, forward relevant instructions of the exchange computing unit to the management module, and forward an instruction response of the management module to the exchange computing unit.

Optionally, the control module includes an exchange computing unit and an device controller; the exchange computing unit is configured to determine the device type, the operating power and the target power supply mode, output the first control signal or the second control signal, send the first control signal or the second control signal to the power selection module, transmit the device type, the operating power, the target power supply mode, the protection voltage range, the protection current range and the protection temperature range to the device controller, and learn the voltage, current, power consumption, temperature, short-circuit states and detection grading results of the respective ports from the management module through the device controller; the device controller is configured to forward the relevant instructions of the exchange computing unit to the management module, and forward the instruction response of the management module to the exchange computing unit.

Optionally, the control module includes an exchange computing unit; the exchange computing unit is configured to determine the device type, the operating power and the target power supply mode, output the first control signal or the second control signal, send the first control signal or the second control signal to the power selection module, transmit the device type, the operating power, the target power supply mode, the protection voltage range, the protection current range and the protection temperature range to the management module, and learn the voltage, current, power consumption, temperature, short-circuit states and detection grading results of the respective ports from the management module.

Optionally, the power sourcing equipment further includes a second power module; the second power module is configured to provide a third voltage to a target circuit, and the target circuit does not include the management module, the device controller and the power selection module.

Optionally, the power sourcing equipment further includes an isolator; the isolator is configured to isolate the target circuit powered by the second power module from a circuit powered by the first power module.

Optionally, the power sourcing equipment further includes a second power conversion module; the second power conversion module is configured to convert the first voltage into a fourth voltage and provide the fourth voltage to the isolator, the management module, the device controller and the inverter in the power selection module.

At least one advantageous aspect of the Ethernet-based power sourcing equipment provided according to the embodiment of the present application lies in that: the device type, operating power and target power supply mode of a powered device are determined by a control module to output a first control signal or a second control signal, whether respective ports are supplied with power or not is determined and the power for power supplying of the respective ports are managed by the management module so that the first voltage or the second voltage is controlled to be output by the power selection module, and then the first voltage or the second voltage is provided to the powered device through the voltage output terminal, so that the same power sourcing equipment can supply power for the standard powered device and the non-standard powered device at the same time.

BRIEF DESCRIPTION OF THE DRAWINGS

One or more embodiments are exemplarily described with reference to pictures in corresponding attached drawings, and these exemplary descriptions are not intended to limit the embodiments. In the attached drawings, elements with the same reference numerals represent the same or similar elements, and unless otherwise stated, the pictures in the attached drawings are not intended to limit the scale.

FIG. 2 is a schematic view illustrating standard PoE parameter comparison according to an embodiment of the present application.

FIG. 3 is a schematic view illustrating non-standard PoE parameter comparison according to an embodiment of the present application.

DETAILED DESCRIPTION

In order to facilitate the understanding of the present application, the present application will be described in more detail hereinafter with reference to the attached drawings and specific embodiments. It shall be noted that, when an element is said to be "connected" to another element, it may be directly connected to the other element, or there may be one or more intervening elements therebetween. Terms such as "upper", "lower", "inside" and "outside" used in this specification indicate orientation or positional relationships based on the orientation or positional relationships shown in the attached drawings, and those terms are only provided for the convenience of describing the present application and simplifying the description, and do not indicate or imply that the devices or elements referred to must have a specific orientation or must be constructed and operated in a specific orientation, so these terms should not be construed as limitations to the present application. In addition, terms such as "first", "second" and "third" are only used for descriptive purposes and should not be construed as indicating or implying relative importance.

Unless otherwise defined, all technical and scientific terms used in this specification have the same meaning as commonly understood by those skilled in the art to which the present application belongs. The terms used in the specification of the present application in this specification are only for the purpose of describing specific embodiments and are not intended to limit the present application.

In addition, technical features involved in different embodiments of the present application described below may be combined with each other as long as they do not conflict with each other.

Figure 1:
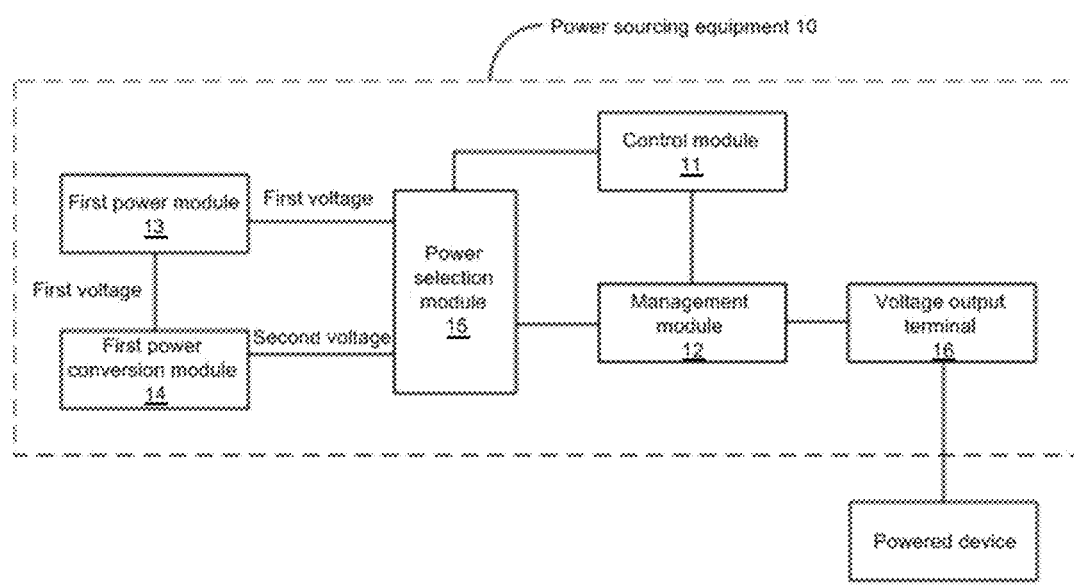
FIG. 1 is a functional block diagram of an Ethernet-based power sourcing equipment according to an embodiment of the present application.

FIG. 1 is a functional block diagram of an Ethernet-based power sourcing equipment provided according to an embodiment of the present application. As shown in FIG. 1, the power sourcing equipment 10 includes a control module 11, a management module 12, a first power module 13, a first power conversion module 14, a power selection module 15 and a voltage output terminal 16.

The management module 12 respectively is connected with the control module 11, the power selection module 15 and the voltage output terminal 16, the voltage output terminal 16 is connected with the powered device, the power selection module 15 is respectively connected with the control module 11, the first power module 13 and the first power conversion module 14, and the first power module 13 is connected with the first power conversion module 14.

The control module 11 is configured to: determine the device type, operating power and target power supply mode of a powered device, output a first control signal or a second control signal, and transmit the device type, the operating power, the target power supply mode, a protection voltage range, a protection current range and a protection temperature range to the management module 12.

The device type is used for indicating a standard powered device or a non-standard powered device.

It shall be noted that, the device type, the operating power and the target power supply mode of the powered device are input and configured by the user to the control module 11, so that the control module 11 obtains the device type, the operating power and the target power supply mode.

The management module 12 is configured to: determine whether respective ports are supplied with power or not and manage the power for power supplying of the respective ports according to instructions of the control module 11, and transmit the voltage, current, power consumption, temperature, short-circuit states and detection grading results of the respective ports to the control module 11.

The instructions of the control module 11 include but are not limited to: the device type, the operating power, the target power supply mode, the protection voltage range, the protection current range and the protection temperature range.

It shall be noted that, the standard powered device refers to the powered device conforming to the power over Ethernet (POE) standard technology, while the non-standard powered device refers to the powered device conforming to the non-standard PoE technology.

It shall be noted that the target power supply mode is 2-pair power supply or 4PPoE, wherein 2-pair power supply includes an Alternative A and an Alternative B, the Alternative A is to load voltages on wire pairs of 1/2 and 3/6, the Alternative B is to load voltages on wire pairs of 4/5 and 7/8, and 4PPoE is to use all the 4 wire pairs for power supply at the same time.

In addition to the three power supply modes appointed above, Institute of Electrical and Electronics Engineers (IEEE) further provides a set of signaling standards for identifying the power sourcing equipment (PSE) and the powered device (PD). Such signaling allows the power sourcing equipment to detect the existence of qualified powered device and allow the powered device and the power sourcing equipment to negotiate the electric quantity that is required or available.

FIG. 2 is a schematic view illustrating standard PoE parameter comparison provided according to an embodiment of the present application. As shown in FIG. 2, the standard PoE requires that the power sourcing equipment must support one of the Alternative A, the Alternative B or the 4PPoE, and the corresponding powered device must be able to automatically identify and adapt to the Alternative A, the Alternative B or the 4PPoE.

FIG. 3 is a schematic view of non-standard PoE parameter comparison provided according to an embodiment of the present application. As shown in FIG. 3, the non-standard PoE learns from the standard PoE, and it may adopt the 2-pair power supply (including the Alternative A and the Alternative B) or the 4PPoE. Since there is no standard constraint on the non-standard PoE, the PD in the non-standard PoE is not forced to support and automatically adapt to the Alternative A, the Alternative B or the 4PPoE. However, for a specific non-standard PD, a matching non-standard PSE must be used. For example, the PD in the Alternative A must be used in combination with the PSE in the Alternative A, the PD in the Alternative B must be used in combination with the PSE in the Alternative B, and the PD in the 4PPoE must be used in combination with the PSE in the 4PPoE. In addition, as compared to the standard PoE, the non-standard PoE has no process of detection, classification and marking, and power is supplied compulsorily and directly. The common supplying voltage is 48V to 52.8V or 24V to 26.4V, and the common receiving voltage is 43.2V to 52.8V or 21.6V to 26.4V.

The first power module 13 is configured to provide a first voltage to the power sourcing equipment 10. The first power conversion module 14 receives the first voltage provided by the first power module 13, and the first power conversion module 14 is configured to convert the first voltage into a second voltage.

Generally, the first voltage is greater than the second voltage, and at this point, the first power conversion module 14 is a buck module. By way of illustration but not limitation, the first voltage may range from 48 volts (V) to 52.8V or 44V to 57V, and no limitation is made thereto as long as the first voltage can cover voltage requirements of standard PoE and the higher voltage of non-standard PoE at the same time. By way of illustration but not limitation, the second voltage may range from 21.6V to 26.4V, or the second voltage may be 18V or 36V, and no limitation is made thereto as long as the second voltage can meet the lower voltage of non-standard PoE. For example, the first voltage is 48V, which is converted into 24V (the second voltage) by the first power conversion module 14 (the buck module).

Particularly, if the first voltage is less than the second voltage, then the first power conversion module 14 is a booster module. By way of illustration but not limitation, the first voltage may range from 21.6V to 26.4V or the first voltage may be 18V or 36V, and no limitation is made thereto as long as the first voltage can meet the lower voltage of non-standard PoE. By way of illustration but not limitation, the second voltage may range from 48V to 52.8V or 44V to 57V, and not limitation is made thereto as long as the second voltage can cover the voltage requirements of standard PoE and the higher voltage of non-standard PoE at the same time. For example, the first voltage is 24V, which is converted into 48V (the second voltage) by the first power conversion module 14 (the booster module).

The power selection module 15 receives the first control signal or the second control signal sent by the control module 11. The power selection module 15 is configured to control the first voltage to be output when the first control signal is received, and control the second voltage to be output when the second control signal is received. The voltage level of the first control signal is greater than the voltage level of the second control signal. For example, the first control signal is at a high level and the second control signal is at a low level.

The voltage output terminal 16 is configured to provide the first voltage or the second voltage to the powered device through the target power supply mode. The first voltage or the second voltage sequentially passes through the power selection module 15, the management module 12, the voltage output terminal 16 and the wire pair corresponding to the target power supply mode, and then is transmitted to the powered device.

Therefore, the Ethernet-based power sourcing equipment provided according to the embodiment of the present application is a power sourcing equipment that can support both standard PoE and nonstandard PoE. That is, the Ethernet-based power sourcing equipment can support various standard powered devices conforming to 802.3af/at/bt or the like, and it can also support various non-standard PDs such as 2pair-low, 2pair-high, 4pair-high and 4pair-low. For the non-standard PoE, the power sourcing equipment may be configured as to whether the voltage is high or low, whether the wire pair is 2-pair power supply or 4PPoE, and whether power supply is performed with the Alternative A or the Alternative B in the case of 2-pair power supply.

Figure 4:
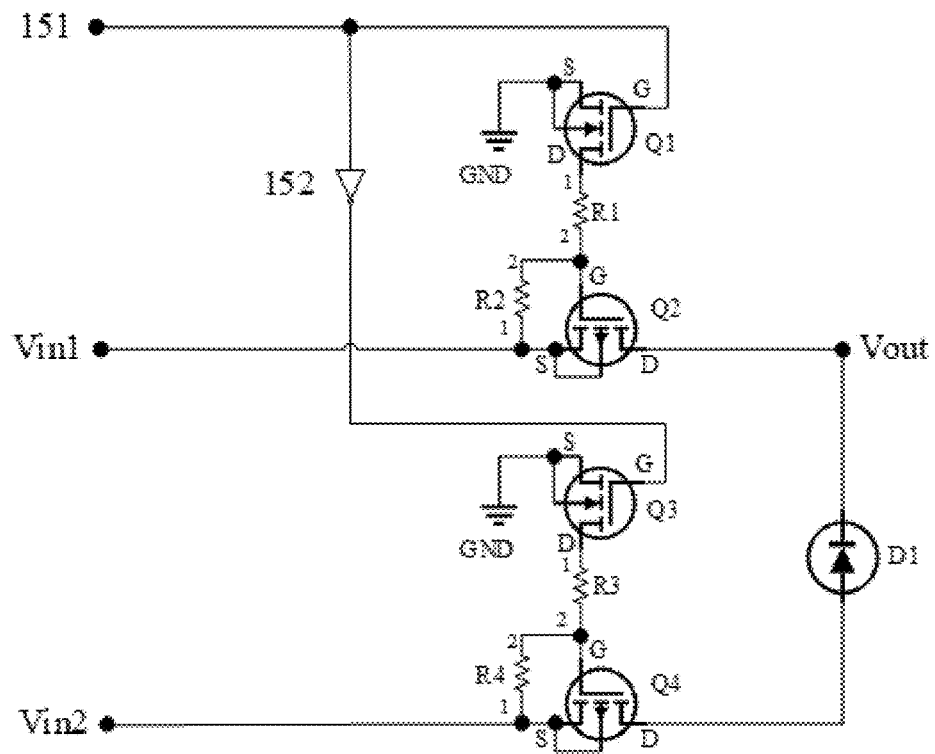
FIG. 4 is a schematic circuit diagram of a power selection module according to an embodiment of the present application.

In some embodiments, FIG. 4 is a schematic circuit diagram of a power selection module provided according to an embodiment of the present application. As shown in FIG. 4, the power selection module 15 includes a signal input terminal 151, a first N-type MOS transistor Q1, a first P-type MOS transistor Q2, a second N-type MOS transistor Q3, a second P-type MOS transistor Q4, a first resistor R1, a second resistor R2, a third resistor R3, a fourth resistor R4, an inverter 152, a diode D1, a first power input terminal Vin1, a second power input terminal Vin2 and a power output terminal Vout.

The inverter 152, also called a NOT gate, is a logic gate for achieving logic negation in digital logic and it is used to invert the level of an input signal. For example, when the input voltage is at a high level, the output voltage is at a low level. When the input voltage is at a low level, the output voltage is at a high level.

The signal input terminal 151 is connected with the control module 11, and the signal input terminal 151 is used for receiving the first control signal or the second control signal output by the control module 11. The first power input terminal Vin1 is connected with the first power module 13, and the first power input terminal Vin1 is used for receiving the first voltage output by the first power module 13. The second power input terminal Vin2 is connected with the first power conversion module 14, and the second power input terminal Vin2 is used for receiving the second voltage output by the first power conversion module 14. The power output terminal Vout is connected to the management module 12, and the power output terminal Vout is used for outputting the first voltage or the second voltage to the management module 12.

The signal input terminal 151 is respectively connected with the gate G of the first N-type MOS transistor Q1 and an input terminal of the inverter 152, and an output terminal of the inverter 152 is connected with the gate G of the second N-type MOS transistor Q3.

The drain D of the first N-type MOS transistor Q1 is connected to a first terminal of the first resistor R1, a second terminal of the first resistor R1 is connected to the gate G of the first P-type MOS transistor Q2, and the source S of the first N-type MOS transistor Q1 is connected to the ground GND.

The source S of the first P-type MOS transistor Q2 respectively is connected to the first power input terminal Vin1 and a first terminal of the second resistor R2, a second terminal of the second resistor R2 is connected to the gate G of the first P-type MOS transistor Q2, and the drain D of the first P-type MOS transistor Q2 is connected to the power output terminal Vout.

The drain D of the second N-type MOS transistor Q3 is connected to a first terminal of the third resistor R3, a second terminal of the third resistor R3 is connected to the gate G of the second P-type MOS transistor Q4, and the source S of the second N-type MOS transistor Q3 is connected to the ground GND.

The source S of the second P-type MOS transistor Q4 is respectively connected with the second power input terminal Vin2 and a first terminal of the fourth resistor R4, and a second terminal of the fourth resistor R4 is connected with the gate G of the second P-type MOS transistor Q4.

In some embodiments, as shown in FIG. 4, when the first voltage is higher than the second voltage, the drain D of the second P-type MOS transistor Q4 is connected with the positive electrode of the diode D1, and the negative electrode of the diode D1 is connected with the power output terminal Vout.

When the first control signal is received by the signal input terminal 151, both the first N-type MOS transistor Q1 and the first P-type MOS transistor Q2 are turned on, and the first voltage sequentially passes through the first power input terminal Vin1 and the first P-type MOS transistor Q2 and is output to the power output terminal Vout.

The first control signal passes through the inverter 152 to generate a first electrical signal with an inverted level, so that both the second N-type MOS transistor Q3 and the second P-type MOS transistor Q4 are turned off and thus the loop between the second power input terminal Vin2 and the power output terminal Vout is disconnected.

For example, it is assumed that the first voltage is 48V, and when the first control signal is at a high level such as 3.3V, the Vgs of Q1 is equal to 3.3V. If Q1 is properly selected, then 3.3V will be greater than the Vgs turn-on threshold of Q1, and thus Q1 is connected to ground and the drain D of Q1 is 0V. At this point, a voltage of 48V is input to the source S of Q2, and the voltage of the gate G of Q2 is between 0V and 48V through the voltage division by R2 and R1. By selecting appropriate R1, R2 and Q2, the Vgs of Q2 is less than the Vgs turn-on threshold voltage of Q2, so that Q2 is turned on and the drain D of Q2 outputs the voltage of 48V to the power output terminal Vout. The first control signal passes through the inverter 152 to generate a first electrical signal with an inverted level, and the first electrical signal is at a low level so that both the second N-type MOS transistor Q3 and the second P-type MOS transistor Q4 are turned off and thus the loop between the second power input terminal Vin2 and the power output terminal Vout is disconnected.

When the second control signal is received by the signal input terminal 151, both the first N-type MOS transistor Q1 and the first P-type MOS transistor Q2 are turned off so that the loop between the first power input terminal Vin1 and the power output terminal Vout is disconnected.

The second control signal passes through the inverter 152 to generate a second electrical signal with an inverted level so that both the second N-type MOS transistor Q3 and the second P-type MOS transistor Q4 are turned on, and the second voltage sequentially passes through the second power input terminal Vin2, the second P-type MOS transistor Q4 and the diode D1 and is output to the power output terminal Vout.

For example, it is assumed that the first voltage is 48V and the second voltage is 24V, and when the second control signal is at a low level such as 0V, the Vgs of Q1 is equal to 0V, and 0V is less than the Vgs turn-on threshold of Q1, so Q1 is turned off. At this point, the gate voltage of Q2 is equal to 48V, and Vgs-0V, which is greater than the Vgs turn-on threshold voltage (a negative value) of Q2, so that Q2 is turned off, the loop between the first power input terminal Vin1 and the power output terminal Vout is disconnected, and the drain D of Q2 does not output the voltage of 48V. Because there is a body diode in Q2 with the source S of Q2 as the negative electrode and the drain D of Q2 as the positive electrode, there will be no current backflow in Q2. The second control signal passes through inverter 152 to generate a second electrical signal with an inverted level, the second electrical signal is at a high level such as 3.3V, and Vgs of Q3 is equal to 3.3V. If Q3 is properly selected, then 3.3V will be greater than the Vgs on-threshold of Q3, and thus Q3 is connected to ground, and the drain D of Q3 is 0V. At this point, a voltage of 24V is input to the source S of Q4, and the voltage of the gate G of Q4 is between 0V and 24V through the voltage division by R3 and R4. By selecting appropriate R4, R3 and Q4, the Vgs of Q4 is less than the Vgs turn-on threshold voltage of Q4, so that Q4 is turned on, and the drain D of Q4 outputs the voltage of 24V to the diode D1, and then to the power output terminal Vout through the diode D1.

It should be noted that because there is a body diode with the source S of Q4 as the negative electrode and the drain D of Q4 as the positive electrode in the second P-type MOS transistor Q4, it is necessary to add a diode D1 between the drain D of Q4 and the drain D of Q2 in order to prevent current backflow. If the diode D1 is not added, then when the drain D of Q2 outputs the voltage of 48V, the current will flow backwards to Q4, thus burning Q4.

Figure 5:
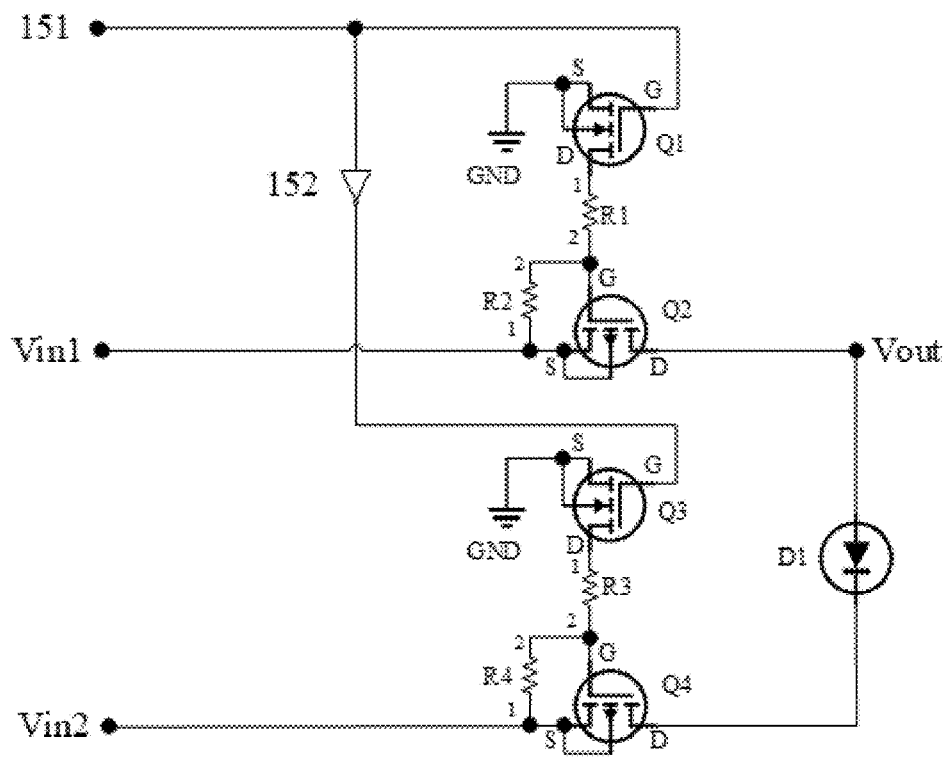
FIG. 5 is a schematic circuit diagram of a power selection module according to another embodiment of the present application.

In some embodiments, as shown in FIG. 5, which is a schematic circuit diagram of a power selection module according to another embodiment of the present application, when the first voltage is lower than the second voltage, the drain D of the second P-type MOS transistor Q4 is connected with the negative electrode of the diode D1, and the positive electrode of the diode D1 is connected with the power output terminal Vout.

In some embodiments, when the current of the second voltage is small, an ordinary low forward voltage drop diode may be used instead of the diode D1. When the current of the second voltage is large, it is necessary to choose an ideal diode circuit to replace the diode D1 to reduce the power loss caused by ordinary diodes, wherein the ideal diode circuit includes an ideal diode controller and an N-type MOS transistor.

Figure 6:
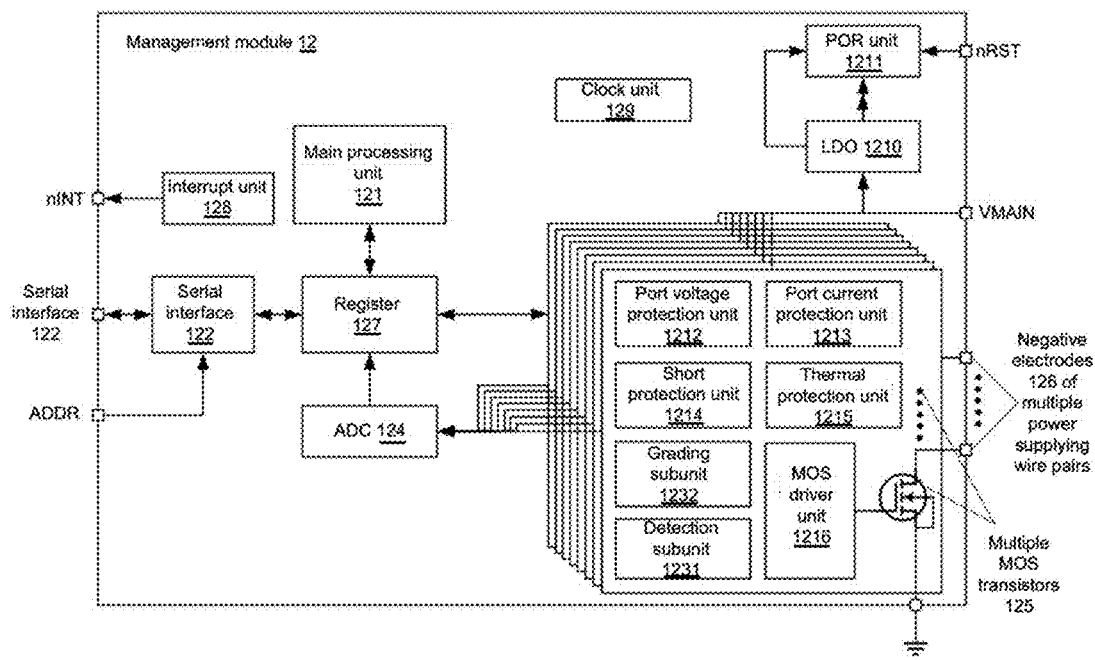
FIG. 6 is a functional block diagram of a management module according to an embodiment of the present application.

In some embodiments, FIG. 6 is a functional block diagram of a management module provided according to an embodiment of the present application. As shown in FIG. 6, the management module 12 includes a main processing unit 121, a serial interface 122, a detection grading unit 123, an analog to digital converter 124, a plurality of MOS transistors 125, a power input pin VMAIN, negative electrodes 126 of a plurality of power supplying wire pairs, and a register 127.

The serial interface 122 is connected with the powered device, the detection grading unit 123 and the analog to digital converter 124 respectively.

By way of illustration but not limitation, the serial interface 122 may be an interface supporting an Inter-Integrated Circuit (IIC) bus or a Serial Peripheral interface (SPI), without being limited thereto.

In some embodiments, the detection grading unit 123 includes a detection subunit 1231 and a grading subunit 1232.

The detection subunit 1231 is configured as follows: the detection subunit 1231 does not operate when the device type indicates a non-standard powered device; and the detection subunit 1231 performs detection processing according to the preset standard when the device type indicates a standard powered device.

It should be noted that the preset standard is used to indicate the signaling standard provided according to IEEE.

The grading subunit 1232 is configured as follows: the grading subunit 1232 does not operate when the device type indicates a non-standard powered device; and the grading subunit 1232 performs power grading processing and controls power for power supplying based on the preset standard and the operating power when the device type indicates a standard powered device.

For example, the grading subunit 1232 provides a detection voltage to the powered device to detect the power level of the powered device, and the powered device indicates its required maximum power (i.e., the operating power) to the power sourcing equipment by absorbing different constant currents (power grading characteristic signals) from the wires.

The analog to digital converter (ADC) 124 refers to an electronic element that converts an analog signal into a digital signal, and it usually converts an input voltage signal into an output digital signal.

Therefore, the analog to digital converter 124 is configured to detect and transmit the voltage, current and temperature of respective ports to the register 127, and the register 127 transmits the voltage, current and temperature of the respective ports to the control module 11 through the serial interface.

By way of illustration but not limitation, the main processing unit 121 may be a Micro Control Unit (MCU), a Central Processing Unit (CPU), or other similar processors with computing functions, and no limitation is made thereto.

The main processing unit 121 is configured to set or acquire relevant register contents based on the instructions of the control module 11 and protection thresholds of related parameters, and control and query the power supply behavior of the respective ports/the respective power supplying wire pairs.

The protection thresholds of the related parameters include but are not limited to the protection voltage range, the protection current range and the protection temperature range.

The relevant register contents include but are not limited to the voltage, current and temperature of respective ports.

It shall be noted that among the plurality of MOS transistors 125, each MOS transistor 125 corresponds to the negative electrode 126 of one power supplying wire pair. Each MOS transistor 125 is controlled to be turned on or turned off to enable power supply or power supply interruption of the respective ports/the respective power supplying wire pairs.

In some embodiments, as shown in FIG. 6, the management module 12 further includes an interrupt unit 128, a clock unit 129, a Low Dropout Linear Regulator (LDO) 1210, a Power-On Reset (POR) unit 1211, a port voltage protection unit 1212, a port current protection unit 1213, a short protection unit 1214, a thermal protection unit 1215, and a MOS driver unit 1216.

The management module 12 further includes an interrupt output pin nINT, an address input pin ADDR and a reset input pin nRST.

In some embodiments, the voltage output terminal 16 includes a network transformer 161 and a network interface 162.

The network transformer 161 is respectively connected with the power input pin VMAIN and the negative electrode 126 of the respective power supplying wire pairs, the management module 12 is connected with the power selection module 15, and the network interface 162 is respectively connected with the network transformer 161 and the powered device.

It shall be noted that the network transform 161 is a network transformer used in a POE scenario, which plays a role in increasing signal driving capability, isolating and injecting POE voltages (the first voltage and the second voltage).

By way of illustration but not limitation, the network interface 162 may be an RJ45 interface or other similar interfaces, and no limitation is made thereto.

The management module 12 is configured to perform switch control on the negative electrode 126 of the respective power supplying wire pairs based on the device type, the operating power and the target power supply mode.

The power input pin VMAIN is short-circuited with the positive electrode of the respective ports/the positive electrode of the respective power supplying wire pairs. The power input pin VMAIN is connected with the power output terminal Vout in the power selection module 15 to receive the first voltage and the second voltage.

Therefore, the first voltage or the second voltage output by the power selection module 15 sequentially passes through the power input pin VMAIN, the negative electrodes 126 of multiple power supplying wire pairs, the network transformer 161 and the network interface 162, and is output to the powered device.

In some embodiments, the power sourcing equipment 10 further includes a second power module 17.

The second power module 17 is configured to provide a third voltage to the target circuit, and the target circuit does not include the management module 12, the device controller and the power selection module 15.

By way of illustration but not limitation, the third voltage may range from 11.4V to 12.6V, and the third voltage may also be 5V or 9V or other voltages, as long as it is within the input range of low-voltage DC power supply on the circuit main board. Specifically, it may also be necessary to convert the third voltage to a lower voltage. For example, the third voltage is 12V, and in different application scenarios, it may be necessary to further convert 12V to 5V, 3.3V, 2.5V, 1.8V, 1.2V, 0.95V, 0.9V or 0.6V or other lower voltages.

In some embodiments, the power sourcing equipment 10 further includes an isolator 18.

The isolator 18 is configured to isolate the target circuit powered by the second power module 17 from the circuit powered by the first power module 13.

It shall be noted that the isolator 18 is generally based on an optocoupler or a capacitive isolation gate.

In some embodiments, the power sourcing equipment 10 further includes a second power conversion module 19.

The second power conversion module 19 is configured to convert the first voltage into a fourth voltage and provide the fourth voltage to the isolator 18, the management module 12, the device controller and the inverter 152 in the power selection module 15.

By way of illustration but not limitation, the fourth voltage may be 3.3V, 1.8V or 5V, and the specific fourth voltage may be set according to the actual circuit, and no limitation is made thereto. For example, the second power conversion module 19 is a 48V-to-3.3V power module, which is used to convert 48V into 3.3V and provide the 3.3V to the isolator 18, the management module 12, the device controller and the inverter 152 in the power selection module 15 for use.

In some embodiments, the power sourcing equipment 10 further includes an integrated circuit (IC) 110 of a port physical layer (PHY).

The integrated circuit 110 of the port physical layer is respectively connected with the exchange computing unit and the network transformer 161.

The integrated circuit 110 of the port physical layer is used to convert Multiple Access Channel (MAC) signals into Ethernet electrical ports, for example, twisted pair Ethernet (10BASE-T), twisted pair of two wire pairs (100BASE-TX) with a transmission rate of 100 Mbit/s and twisted pair of four wire pairs (5GBASE-T) with a transmission rate of 5000 Gbit/s.

For example, the interface between the integrated circuit 110 of the port physical layer and the exchange computing unit is generally a Serial Gigabit Media Independent Interface (SGMII), a Quad Serial Gigabit Media Independent interface (QSGMII), a Universal Serial 10G Media Independent Interface (USXGMII) and a Serial Management Interface (SMI).

For example, the interface between the integrated circuit 110 of the port physical layer and the network transformer 161 is a Medium Dependent Interface (MDI).

Figure 7:
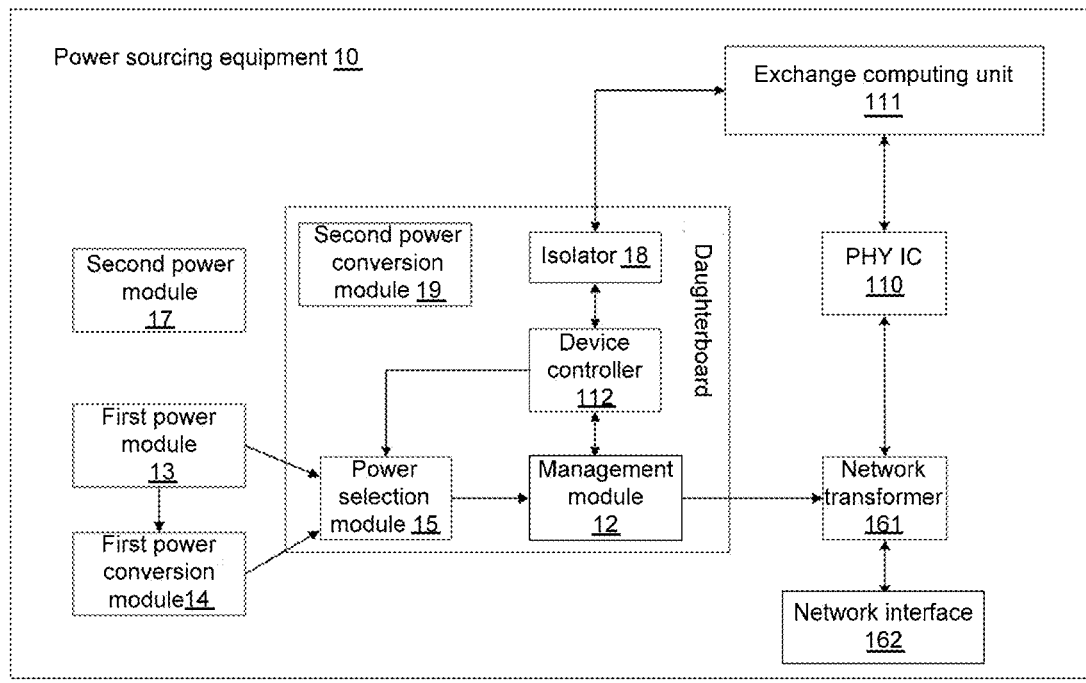
FIG. 7 is a functional block diagram of a power selection module controlled by a device controller according to an embodiment of the present application.

In some embodiments, FIG. 7 is a functional block diagram of a power selection module controlled by a device controller according to an embodiment of the present application. As shown in FIG. 7, the control module 11 includes an exchange computing unit 111 and a device controller 112.

It shall be noted that the exchange computing unit 111 has the function of exchanging multiple access channel signals and the calculation function of the central processor. By way of illustration but not limitation, the exchange computing unit 111 may be an integrated circuit integrating an MAC signal exchanging function with a CPU function, or the exchange computing unit 111 may also include an integrated circuit with an MAC signal exchanging function and an integrated circuit with a CPU function.

The exchange computing unit 111 is connected to the isolator 18, and the isolator 18 is connected to the device controller 112. By way of illustration but not limitation, the interface between the exchange computing unit 111 and the isolator 18 includes, but is not limited to, an interface of the IIC bus and an interface of a Universal Asynchronous Receiver Transmitter (UART). The interface between the isolator 18 and the device controller 112 includes, but is not limited to, an interface of IIC and an interface of UART.

The device controller 112 is connected to the power selection module 15 and the management module 12 respectively.

By way of illustration but not limitation, the interface between the device controller 112 and the management module 12 includes, but is not limited to, an interface of the IIC bus and a serial peripheral interface.

The exchange computing unit 111 is configured to determine the device type, the operating power and the target power supply mode, output the first control signal or the second control signal, and transmit the device type, the operating power, the target power supply mode, the protection voltage range, the protection current range and the protection temperature range to the device controller 112, and receive the voltage, current, power consumption, temperature, short-circuit states and detection grading results of the respective ports from the management module 12, through the device controller 112.

The device controller 112 is configured to forward the first control signal or the second control signal of the exchange computing unit 111 to the power selection module 15, forward the related instructions of the exchange computing unit 111 to the management module 12, and forward the instructions of the management module 12 to the exchange computing unit 111.

The relevant instructions of the exchange computing unit 111 include but are not limited to: the device type, the operating power, the target power supply mode, the protection voltage range, the protection current range and the protection temperature range.

The instructions of the management module 12 include but are not limited to: the voltage, current, power consumption, temperature, short-circuit states and detection grading results of the respective ports.

By way of illustration but not limitation, the isolator 18, the device controller 112, the power selection module 15, the management module 12 and the second power conversion module 19 may be provided in the form of a daughterboard or may be provided on the main board, and no limitation is made thereto. As shown in FIG. 7, these components are provided in the form of a daughterboard.

Figure 8:
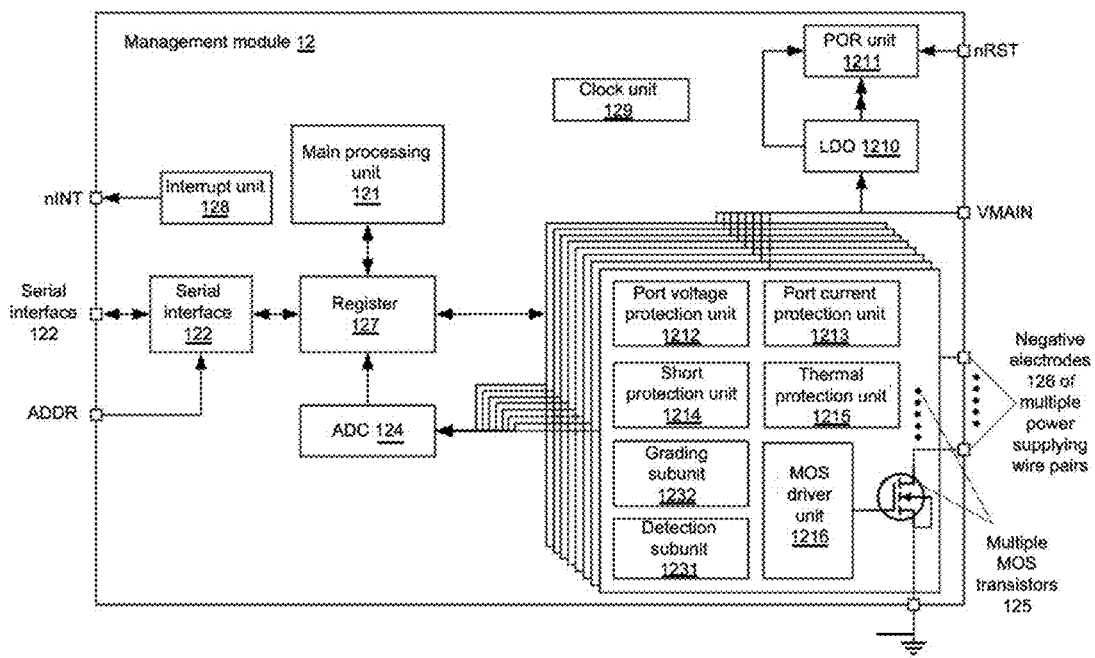
FIG. 8 is a functional block diagram of the power selection module controlled by an exchange computing unit according to an embodiment of the present application.

In some embodiments, FIG. 8 is a functional block diagram of the power selection module controlled by an exchange computing unit provided according to an embodiment of the present application. Based on FIG. 7, as shown in FIG. 8, the control module 11 includes an exchange computing unit 111 and a device controller 112.

The exchange computing unit 111 is connected to an isolator 18, and the isolator 18 is connected to the power selection module 15. The exchange computing unit 111 is connected with another isolator 18, which is connected with the device controller 112, and the device controller 112 is connected with the management module 12.

The device type, the operating power, the target power supply mode, the protection voltage range, the protection current range and the protection temperature range are transmitted to the device controller 112, and the voltage, current, power consumption, temperature, short-circuit states and detection grading results of the respective ports are obtained from the management module 12 through the device controller 112.

The device controller 112 is configured to forward the relevant instructions of the exchange computing unit 111 to the management module 12, and forward the instructions of the management module 12 to the exchange computing unit 111.

By way of illustration but not limitation, the interfaces between the isolator 18 connected to the power selection module 15 and the exchange computing unit 111 include, but are not limited to, a plurality of General Purpose Interfaces (GPIs) and three GPI serial interfaces, and an isolator using three GPI serial interfaces needs to add 74595 logic chips for serial-parallel conversion.

Figure 9:
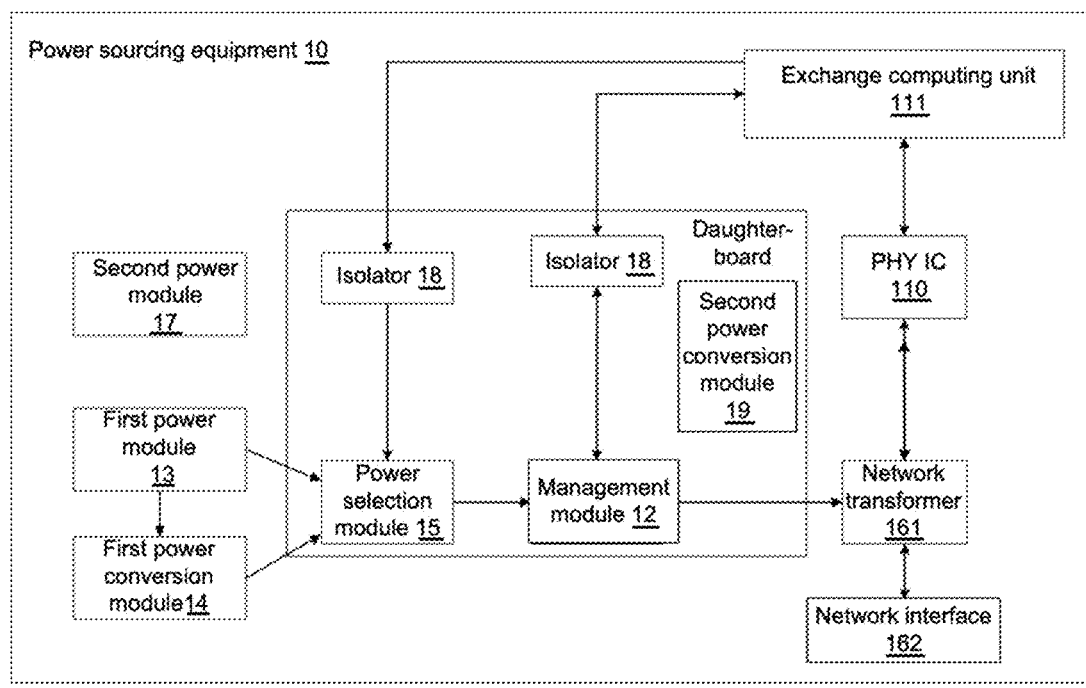
FIG. 9 is a functional block diagram of the power selection module controlled by an exchange computing unit and a management module connected with the exchange computing unit according to an embodiment of the present application.

In some embodiments, FIG. 9 is a functional block diagram of the power selection module controlled by an exchange computing unit and a management module connected with the exchange computing unit according to an embodiment of the present application. As shown in FIG. 9, the device controller 112 is removed and replaced by the exchange computing unit 111 as compared to FIG. 7 and FIG. 8. Thus, the control module 11 includes an exchange computing unit 111.

The exchange computing unit 111 is connected to an isolator 18, and the isolator 18 is connected to the power selection module 15. The exchange computing unit 111 is connected with another isolator 18, which is connected with the management module 12.

By way of illustration but not limitation, the interfaces between the isolator 18 connected to the management module 12 and the exchange computing unit 111 include, but are not limited to, an interface of the IIC bus and an interface of a Universal Asynchronous Receiver Transmitter (UART).

The exchange computing unit 111 is configured to determine the device type, the operating power and the target power supply mode, output a first control signal or a second control signal, send the first control signal or the second control signal to the power selection module 15, transmit the device type, the operating power, the target power supply mode, the protection voltage range, the protection current range and the protection temperature range to the management module 12, and learn the voltage, current, power consumption, temperature, short-circuit states and detection grading results of the respective ports from the management module 12.

At least one advantageous aspect of the Ethernet-based power sourcing equipment provided according to the embodiment of the present application lies in that: the device type, operating power and target power supply mode of a powered device are determined by a control module to output a first control signal or a second control signal, whether respective ports are supplied with power or not is determined and the power for power supplying of the respective ports are managed by the management module so that the first voltage or the second voltage is controlled to be output by the power selection module, and then the first voltage or the second voltage is provided to the powered device through the voltage output terminal, so that the same power sourcing equipment can supply power for the standard powered device and the non-standard powered device at the same time.

Finally it shall be noted that, the above embodiments are only used to describe but not to limit the technical solutions of this application; and within the spirits of this application, technical features of the above embodiments or different embodiments may also be combined with each other, the steps may be implemented in an arbitrary order, and many other variations in different aspects of this application described above are possible although, for purpose of simplicity, they are not provided in the details. Although this application has been detailed with reference to the above embodiments, those of ordinary skill in the art shall appreciate that modifications can still be made to the technical solutions disclosed in the above embodiments or equivalent substations may be made to some of the technical features, and the corresponding technical solutions will not essentially depart from the scope of the embodiments of this application due to such modifications or substations.

The invention claimed is:

1. An Ethernet-based power sourcing equipment, wherein the power sourcing equipment comprises:
a control module, being configured to: determine a device type, an operating power and a target power supply mode of a powered device, output a first control signal or a second control signal, and transmit the device type, the operating power, the target power supply mode, a protection voltage range, a protection current range and a protection temperature range to a management module;
wherein the device type is used for indicating a standard powered device or a non-standard powered device;
the management module, being configured to: manage a power provisioning status and a power output of respective ports, according to instructions of the control module, and transmit a voltage, a current, a power consumption, a temperature, a short-circuit states and a detection grading results of the respective ports to the control module;
a first power module, being configured to provide a first voltage for the power sourcing equipment;
a first power conversion module, being configured to convert the first voltage into a second voltage;
a power selection module, being configured to control the first voltage to be output when the first control signal is received and control the second voltage to be output when the second control signal is received; wherein the voltage level of the first control signal is greater than the voltage level of the second control signal;
a voltage output terminal, being configured to provide the first voltage or the second voltage to the powered device through the target power supply mode.

2. The power sourcing equipment according to claim 1, wherein the power selection module comprises a signal input terminal, a first N-type MOS transistor, a first P-type MOS transistor, a second N-type MOS transistor, a second P-type MOS transistor, a first resistor, a second resistor, a third resistor, a fourth resistor, an inverter, a diode, a first power input terminal, a second power input terminal and a power output terminal;

the signal input terminal is connected with the control module, the first power input terminal is connected with the first power module, and the second power input terminal is connected with the first power conversion module;

the signal input terminal is respectively connected with a gate of the first N-type MOS transistor and an input terminal of the inverter, and an output terminal of the inverter is connected with a gate of the second N-type MOS transistor;

a drain of the first N-type MOS transistor is connected with a first terminal of the first resistor, a second terminal of the first resistor is connected with a gate of the first P-type MOS transistor, and a source of the first N-type MOS transistor is connected to the ground;

a source of the first P-type MOS transistor is respectively connected with the first power input terminal and a first terminal of the second resistor, a second terminal of the second resistor is connected with the gate of the first P-type MOS transistor, and a drain of the first P-type MOS transistor is connected with the power output terminal;

a drain of the second N-type MOS transistor is connected with a first terminal of the third resistor, a second terminal of the third resistor is connected with a gate of the second P-type MOS transistor, and a source of the second N-type MOS transistor is connected to the ground;

a source of the second P-type MOS transistor is respectively connected with the second power input terminal and a first terminal of the fourth resistor, and a second terminal of the fourth resistor is connected with the gate of the second P-type MOS transistor;

when the first voltage is higher than the second voltage, a drain of the second P-type MOS transistor is connected with a positive electrode of the diode, and a negative electrode of the diode is connected with the power output terminal;

when the first voltage is lower than the second voltage, the drain of the second P-type MOS transistor is connected with the negative electrode of the diode, and the positive electrode of the diode is connected with the power output terminal;

wherein when the first control signal is received by the signal input terminal, both the first N-type MOS transistor and the first P-type MOS transistor are turned on, and the first voltage sequentially passes through the first power input terminal and the first P-type MOS transistor and is output to the power output terminal;

the first control signal passes through the inverter to generate a first electrical signal with an inverted level, so that both the second N-type MOS transistor and the second P-type MOS transistor are turned off and the loop between the second power input terminal and the power output terminal is disconnected;

when the second control signal is received by the signal input terminal, both the first N-type MOS transistor and the first P-type MOS transistor are turned off so that the loop between the first power input terminal and the power output terminal is disconnected;

the second control signal passes through the inverter to generate a second electrical signal with an inverted level so that both the second N-type MOS transistor and the second P-type MOS transistor are turned on, and the second voltage sequentially passes through the second power input terminal, the second P-type MOS transistor and the diode and is output to the power output terminal.

3. The power sourcing equipment according to claim 1, wherein the management module comprises a power input pin and negative electrodes for a plurality of power supplying wire pairs; and the voltage output terminal comprises a network transformer and a network interface;

the network transformer is respectively connected with the power input pin and the negative electrodes for the respective power supplying wire pairs, the management module is connected with the power selection module, and the network interface is respectively connected with the network transformer and the powered device;

the management module is configured to perform switch control on the negative electrodes of the respective power supplying wire pairs based on the device type, the operating power and the target power supply mode;

the power input pin is short-circuited with positive electrodes of the respective ports/positive electrodes of the respective power supplying wire pairs;

the first voltage or the second voltage output by the power selection module sequentially passes through the power input pin, the negative electrodes of the plurality of power supplying wire pairs, the network transformer and the network interface, and is output to the powered device.

4. The power sourcing equipment according to claim 3, wherein the management module further comprises a main processing unit, a serial interface, a detection grading unit, an analog to digital converter and a plurality of MOS transistors;

the serial interface is respectively connected with the powered device, the detection grading unit and the analog to digital converter;

the detection grading unit comprises a detection subunit and a grading subunit;

wherein the detection subunit is configured as follows: the detection subunit does not operate when the device type indicates a non-standard powered device; and the detection subunit performs detection processing according to a preset standard when the device type indicates a standard powered device;

the grading subunit is configured as follows: the grading subunit does not operate when the device type indicates a non-standard powered device; and the grading subunit performs power grading processing and controls power for power supplying based on the preset standard and the operating power when the device type indicates a standard powered device;

the analog to digital converter is configured to detect the voltage, current and temperature of the respective ports and transmit the voltage, current and temperature of the respective ports to a register, and the register transmits the voltage, current and temperature of the respective ports to the control module through the serial interface;

the main processing unit is configured to set or acquire relevant register contents based on the instructions of the control module and protection thresholds of related parameters, and control and query the power supply behavior of the respective ports/the respective power supplying wire pairs;

each MOS transistor among the plurality of MOS transistors corresponds to the negative electrode of one power supplying wire pair, and power supply or power supply interruption of the respective ports/the respective power supplying wire pairs is enabled by controlling the respective MOS transistors to be turned on or turned off.

5. The power sourcing equipment according to claim 1, wherein the control module comprises an exchange computing unit and an device controller;

the exchange computing unit is configured to determine the device type, the operating power and the target power supply mode, output the first control signal or the second control signal, transmit the device type, the operating power, the target power supply mode, the protection voltage range, the protection current range and the protection temperature range to the device controller, and learn the voltage, current, power consumption, temperature, short-circuit states and detection grading results of the respective ports from the management module through the device controller;

the device controller is configured to forward the first control signal or the second control signal of the exchange computing unit to the power selection module, forward relevant instructions of the exchange computing unit to the management module, and forward an instruction response of the management module to the exchange computing unit.

6. The power sourcing equipment according to claim 1, wherein the control module comprises an exchange computing unit and an device controller;

the exchange computing unit is configured to determine the device type, the operating power and the target power supply mode, output the first control signal or the second control signal, send the first control signal or the second control signal to the power selection module, transmit the device type, the operating power, the target power supply mode, the protection voltage range, the protection current range and the protection temperature range to the device controller, and learn the voltage, current, power consumption, temperature, short-circuit states and detection grading results of the respective ports from the management module through the device controller;

the device controller is configured to forward the relevant instructions of the exchange computing unit to the management module, and forward the instruction response of the management module to the exchange computing unit.

7. The power sourcing equipment according to claim 1, wherein the control module comprises an exchange computing unit;

the exchange computing unit is configured to determine the device type, the operating power and the target power supply mode, output the first control signal or the second control signal, send the first control signal or the second control signal to the power selection module, transmit the device type, the operating power, the target power supply mode, the protection voltage range, the protection current range and the protection temperature range to the management module, and learn the voltage, current, power consumption, temperature, short-circuit states and detection grading results of the respective ports from the management module.

8. The power sourcing equipment according to claim 5, wherein the power sourcing equipment further comprises a second power module;

the second power module is configured to provide a third voltage to a target circuit, and the target circuit excludes the management module, the device controller and the power selection module.

9. The power sourcing equipment according to claim 8, wherein the power sourcing equipment further comprises an isolator;

the isolator is configured to isolate the target circuit powered by the second power module from a circuit powered by the first power module.

10. The power sourcing equipment according to claim 9, wherein the power sourcing equipment further comprises a second power conversion module;

the second power conversion module is configured to convert the first voltage into a fourth voltage and provide the fourth voltage to the isolator, the management module, the device controller and the inverter in the power selection module.

* * * * *